Nov. 12, 1963  B. L. BRUCKEN ET AL  3,110,852
MULTI-SPEED MOTOR FOR DOMESTIC APPLIANCE
Filed June 27, 1958  5 Sheets-Sheet 1

INVENTORS
Byron L. Brucken
Thomas H. Fogt
By Edwin S. Wiebke
Their Attorney

INVENTORS
Byron L. Brucken
Thomas H. Fogt
By Edwin S. Dybvig
Their Attorney

INVENTORS
Byron L. Brucken
Thomas H. Fogt
By Edwin S. Dybvig
Their Attorney

United States Patent Office 3,110,852
Patented Nov. 12, 1963

3,110,852
MULTI-SPEED MOTOR FOR DOMESTIC
APPLIANCE
Byron L. Brucken and Thomas H. Fogt, Dayton, Ohio, assignors to General Motors Corporation, Detroit, Mich., a corporation of Delaware
Filed June 27, 1958, Ser. No. 745,152
1 Claim. (Cl. 318—221)

This invention relates to a control circuit for multi-speed motors and more particularly to a centrifugally actuated control circuit for use with multi-speed washing machines.

With the advent of man-made fabrics, the washing machine art has found it necessary to revise washing procedures to make them adaptable to the new fabrics. For this purpose, the washing machines in current vogue include a drive mechanism capable of agitating the clothes at two or more speeds. Furthermore, such mechanism is arranged to spin the clothes in a centrifuging operation at two or more speeds to remove the water from the clothes. It should be apparent that variable loads are imposed on and variable speeds are required of any motor utilized in such drive mechanism. During the spin cycle, for instance, a considerable torque is required to initiate the rotation of a laundry tub up to a speed where the water is substantially spun from the tub. As the water is removed and the tub reaches a maximum spinning speed, the torque required is much less. Another situation requiring a degree of motor flexibility arises in cases of blockage within the tub tending to stall the motor during either the agitating action or the spinning action. It is desirable, therefore, to select a motor which will meet these conditions automatically without requiring complicated sensing devices for the various load situations and without requiring the addition of motor control switches to the already complicated washing machine timer. A multi-speed induction motor has the desired operating characteristics to satisfy these load requirements when circuited in accordance with this invention.

A multi-speed motor in which the torque varies inversely as the speed has been found applicable. These motors are capable of being operated at a number of different speeds and adapted for greatest torque at low speed.

This invention contemplates centrifugally sensing and subsequently utilizing these varying load situations in a washing cycle to automatically control the washing machine motor.

Accordingly, it is an object of this invention to provide appliance circuitry for automatically switching a drive motor to meet various rotating load conditions.

A more particular object of this invention is the provision of a washing machine motor control circuit which with the motor operating at low torque, will automatically switch the motor to high torque operation, in accordance wth a changed washing machine load as evidenced by motor speed.

It is also an object of this invention to initiate a washing machine tub spin with a high speed, high torque two-speed motor to a predetermined spin speed and at a delayed time thereafter selectively shifting the motor to a low speed, low torque two-speed motor with the motor being allowed to drift from the speed attained at the selective shift, to a lower speed determined by the low speed characteristic of the motor.

It is also an object of this invention to provide a two-speed motor having a single start winding with centrifugally actuated means for controlling the start winding in either speed situation.

A specific object of this invention is to increase a start winding's operational range for two-speed motor application by modifying a centrifugally actuated control device whereby said device is effective to deenergize the start winding above low speed and below high speed and to reenergize the start winding below low speed.

Another object of this invention is to provide a two-speed, single start winding motor with a manually operable speed selector switch and a centrifugally actuated switch for cutting out the start winding upon motor acceleration and establishing the circuitry necessary for the speed selected, said centrifugally actuated switch being restrained by spring biased tangs upon motor deceleration to prevent the switch from reenergizing the start winding.

It is also an object of this invention to provide a single weight centrifugal switch with means for altering the speed at which the switch is actuated.

Further objects and advantages of the present invention will be apparent from the following description, reference being had to the accompanying drawings wherein a preferred embodiment of the present invention is clearly shown.

Figure 1:
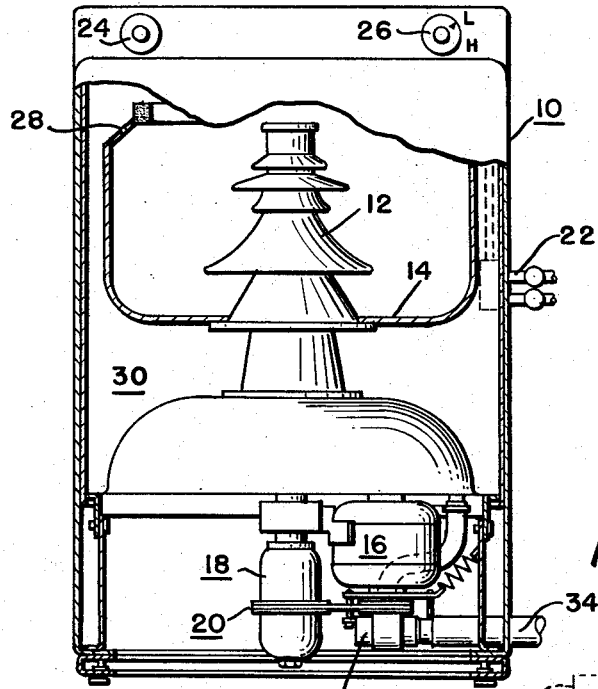
FIGURE 1 is an elevational view of a washing machine, with parts broken away, equipped with a multi-speed motor for reciprocating an agitator and spinning a tub.

In accordance with this invention, a washing machine 10 having an agitator 12 and a tub 14 is provided with a multiple speed motor 16. The motor 16, by means of an agitating and spinning mechanism 18 such as is taught in Sisson 2,758,685, issued August 14, 1956, is adapted to cause the agitator 12 to agitate at two or more speeds and the laundry tub 14 to spin at two or more speeds. A conventional belt drive 20 may be utilized in transmitting the rotative power of motor 16 to the agitating and spinning mechanism 18. Again, in accordance with conventional practice, water may be supplied to the laundry tub 14 through a thermostatic valve arrangement 22. To facilitate selective control of the washing machine operation, the machine may include a timer control 24 and a speed selector 26.

With this arrangement of washing machine components the operator may place a load of clothes to be washed within the laundry tub 14 through an access opening (not shown) in the top of the machine 10. The timer 24 may be set to initiate a washing cycle and the speed selector 26 set for either high or low operating speed. If low speed is selected, for instance, the agitator 12 will agitate for a period controlled by the timer 24. At the conclusion of this agitating or washing action, the timer 24 will condition the motor circuit to initiate a removal of the soiled washing water within the tub 14. This is accomplished by spinning the tub in a manner to cause the water to flow through the openings 28 in the laundry tub 14 into a collecting chamber 30 disposed below. From the chamber 30 a pump 32 may be utilized to remove the water to a remote drain location by means of any suitable conduit 34. Fresh rinse water then be supplied to the tub 14 through the valve 22 and a second agitation or rinse cycle initiated by the timer 24. Following this, the rinse water is removed from the tub 14 with another spinning operation of the tub. Since low speed has been selected, both the agitation and the spinning action are accomplished at the low speed of motor 16. During the spinning of tub 14, a variable load is placed on the motor 16, viz. with the tub 14 full of water, a greater resistance to rotation is imposed upon the motor 16 and the motor rotates more slowly at the beginning of the spin cycle. It is these variations from the synchronous motor speeds that are sensed centrifugally by the concepts of this invention to control the motor to meet the changing load conditions.

This invention particularly concerns the operation or control of a washing machine mechanism to operate in any combination of two wash speeds and two spin speeds. The drive is through a reversible motor that causes the mechanism to pulse in one direction and to spin in the opposite direction. The motor is a consequent pole (4–8 pole) motor that operates at 1,725 or 850 r.p.m. Speed selection is accomplished by connecting two sections of the motor main winding in parallel for high speed and in series for low speed. Furthermore, this motor control concept contemplates the use of only one phase or start winding in the motor, which is thus started always in high speed. The utility of this control and motor circuit lies in the fact that acceleration of the motor is accomplished in a salient pole arrangement where the motor torque is high and continuous speed is reached in the consequent pole arrangement, if selected, at lower speeds where there is much less torque available, and, in fact, little required in washing machine application. The unique and novel feature of this control circuit is based on the fact that when motor torque is needed, the motor remains or reverts to the high speed, high torque circuit arrangement—a situation occurring (1) during start, (2) during excessive overload, or (3) stall conditions.

Figure 2:
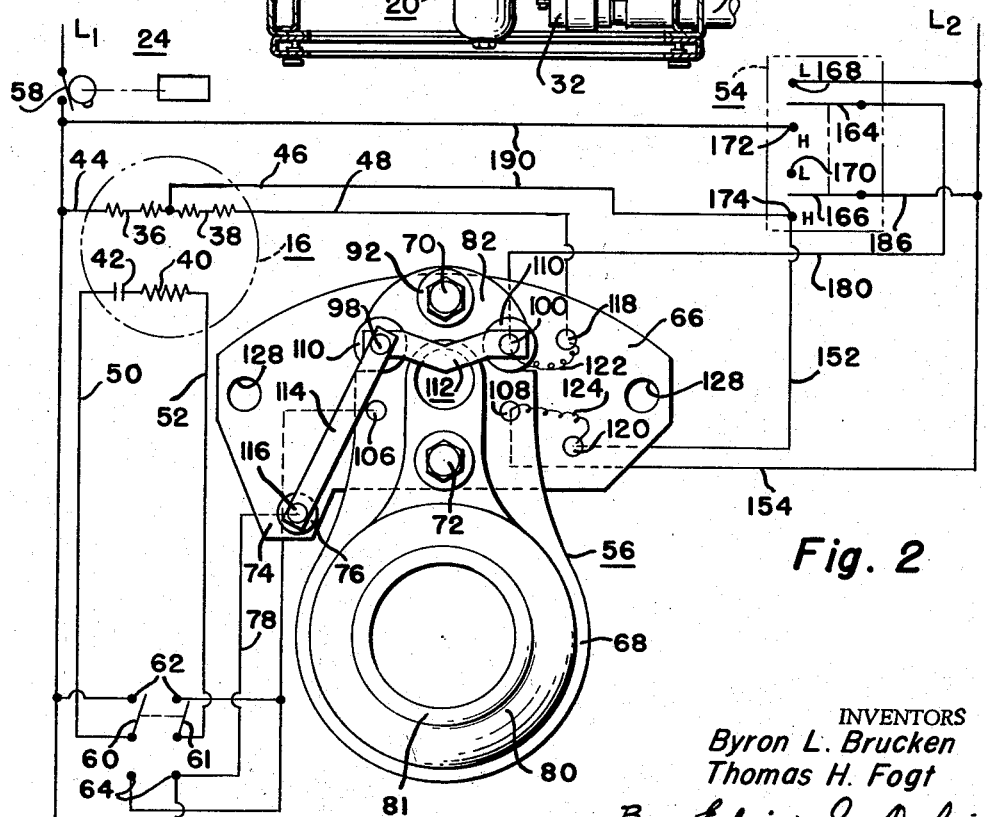
FIGURE 2 is a schematic wiring diagram including a 4–8 pole consequent pole motor, a manually operable speed selector switch and a centrifugally actuated control switch.

With reference to FIGURE 2, the motor control concepts of this invention are shown in a circuit for a motor 16 of the consequent pole type. The motor is wound with a first main winding 36 and a second main winding 38. A start winding 40 is included in an internal motor circuit with a capacitor 42. Extending from the motor casing is a first lead 44, a second or center tap lead 46 and a third lead 48, and from the start winding circuit leads 50 and 52. A speed selector switch, shown generally at 54, is designed for high and low speed motor settings. To centrifugally sense the washing machine load conditions imposed upon motor 16, a centrifugal switch 56 is included in the circuit. The timer 24 is utilized to energize the motor circuit through a cam actuated timer switch 58 at any time that motor operation is desired during a washing machine cycle. The timer 24 includes also motor reversing switches 60, 61 adapted to close agitating contacts 62 during any pulsation portion of the wash cycle, and contacts 64 during any centrifuging or tub spinning portion of the washing cycle.

Figure 3:
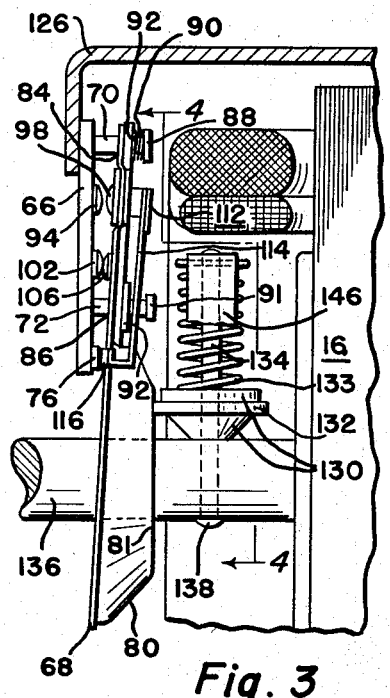
FIGURE 3 is a fragmentary sectional view of a deenergized two-speed electric motor provided with the centrifugal speed switching means of this invention.
Figure 4:
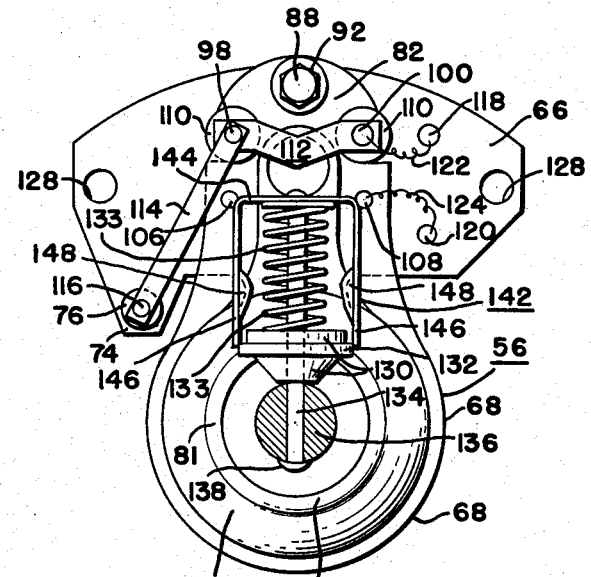
FIGURE 4 is an elevational view taken along line 4—4 of FIGURE 3 showing the centrifugal weight delay spring.

The centrifugal switching means 56 is comprised of a control board 66 of nonconducting material, and a rockably mounted skillet or switch portion 68. The control board 66 has fixed thereto skillet support pins 70, 72 which act to retain the skillet in correct relationship to the board 66. As suggested by the dashed lines in FIGURE 2, the control circuit lines are attached to connecting pieces on the back of the control board 66 which extends through the board into selective engagement with contacts carried on the rocking skillet 68. To eliminate short circuit arc-over in a manner to be described more fully hereinafter, the control board 66 has an extended portion 74 at one side thereof which is adapted to carry a fixed contact 76 to which a circuit line 78 is attached. Further details of the centrifugal switch 56 are best seen in FIGURES 3 and 4 wherein the skillet 68 includes an annular cup-like cam surface 80. Extending from the annular portion and integral therewith is a substantially flat electrical contact portion 82. The flat portion has apertures 84 and 86 formed therein through which the skillet support pins 70 and 72, respectively, project in skillet retaining relationship. The pin 70 includes a head portion 88 which aids in retaining a spring 90 in biasing relationship between the skillet flat portion 82 and the suport pin head 88. Support pin 72 is also formed with a head portion 91 to prevent the skillet 68 from becoming disengaged from the control board 66. Insulating bushings 92 circumscribe the skillet apertures 84, 86 to insulate the pins 70, 72 at the point where they pass through the skillet. Motor running contacts 94, 96 are carried on the control board and arranged to mate with skillet motor running contacts 98, 100. It will be noted that contact 94 is not connected to any line in the circuit, its only function being to balance the skillet 68 when in centrifugally actuated position. Carried also on the skillet's control board 66 are start winding contacts 102, 104 arranged to mate respectively with skillet start winding contacts 106, 108. Contacts 98, 100 are carried by the straight or flat skillet portion 82 but are insulated therefrom by insulating bushings 110. On the other hand, start winding skillet contacts 106, 108 are carried directly on the skillet portion 82. A bridging member 112 connects contacts 98, 100 and is insulated also from skillet 68. Connected also to skillet contact 98 and bridging member 112 is an arm 114, having a contact 116 at one end thereof, extending downwardly into engagement with the offset control panel contact 76. Although members 112 and 114 have been shown as separate parts, it is within the purview of this invention to make these members as an integral member.

To provide means for changing main winding circuitry for the motor 16, the control board 66 carries main winding switch contacts 118, 120. A flexible connection or pigtail 122 interconnects the skillet main winding contact 100 and control board contact 118. Similarly, a flexible connection or pigtail 124 interconnects skillet start winding contact 108 and control board contact 120. For mounting the control board 66 to any suitable motor frame 126, apertures 128 are included thereon.

To actuate the skillet 68, weights 130 and a guide washer 132 of nylon or other suitable material, are mounted on a pin 134 which is secured to the motor shaft 136. The pin 134 is provided with a head 138 to hold the pin securely to the motor shaft 136. At the other end of the pin or rivet 134, a second head portion is formed to retain the assembly on the pin and particularly a weight return delay spring or bracket 142 in correct relationship to the nylon washer 132. A continuous return bias to the skillet actuating washer 132 is provided by a spring 133 interposed between the spring or bracket 142 and the washer 132. The nylon washer 132 is adapted to ride on the annular cam surface 80 as the motor 16 accelerates. As the weight 130 and nylon guide washer 132 move out of engagement with the skillet 68, the action of skillet spring 90 is effective to pivot the skillet into selective engagement with certain of the control board contacts, thereby to give the desired motor control switching.

It should be apparent that, without further modification, the action of weight 130 and nylon washer 132 on the cam surface 80 of skillet 68 during motor operation would be to energize or deenergize the motor start winding 40 at a particular rotational speed of motor shaft 136. However, this invention contemplates the control of a two-speed motor having a single start winding. It is conventional on a single speed motor to drop out the start winding at approximately 75% of the running speed. For example, if a motor's running speed is 1,725 r.p.m., the start winding would be dropped out as the motor accelerated to approximately 1300 r.p.m. And, in the case of overloading with the motor speed decreasing, the start windings would be placed back in the circuit by the action of the centrifugally actuated switch 56 at approximately 1150 r.p.m. The centrifugal switch 56, it will be noted, has an inherent speed differential of about 150 r.p.m. (1300 r.p.m. minus 1150 r.p.m.). This is due to the changed center of gravity for weight 130 and washer 132 as they move from a position on the motor shaft 136 at standstill to a position at the outer terminus of pin 134 at shaft running speed. But where this control circuitry is to be utilized in two-speed motor operation and the low speed is below the motor speed at which the start winding is conveniently dropped out, it is apparent that certain modifications are necessary to the centrifugally actuated switch portion of the motor control circuit if a single start winding is to be used for both motor speeds. One of the basic requirements of this invention, therefore, is a wide differential, centrifugal switch. A high differential must be used on the start winding centrifugal control so that the start winding cuts out at the conventional point (1300 r.p.m.) for 1,725 r.p.m. high speed operation and resets at a speed (700 r.p.m. for instance) below the 850 r.p.m. low speed operation. The centrifugal switch 56, disclosed more particularly in the patent to Shewmon 2,623,979 issued December 30, 1952, has been modified in a novel manner to accommodate the novel motor control concepts of this invention.

A wide differential has been incorporated into the centrifugal switch through the application of a centrifugal weight return delay spring arrangement, shown generally at 142 (FIGURE 4). The spring 142 is formed in a U shape having a top or base portion 144 and side portions or sections 146. Each side wall 146 is provided with a drawn out tab or protuberance 148 which projects inwardly into the path of the skillet actuating washer 132. A teardrop configuration for the protuberances 148 has been found effective in promoting a smooth, flutterless movement of the washer 132 within the spring 142. Thus, as the washer 132 moves radially outwardly in response to the centrifugal force imposed thereon by the rotation of motor shaft 136, the spring protuberances 148 are forced smoothly outwardly to permit the washer 132 to pass. In this regard, it should be apparent that the centrifugal force acting to move the weight 130 and washer 132 outwardly must be sufficient to overcome the radially inward bias of a spring 133 and the obstructing gripping action of delay spring protuberances 148. Conversely, on the deceleration of motor shaft 136, the actuating washer 132 will be returned to the motor shaft when the bias of spring 133 is sufficient to overcome the centrifugal force acting on the washer 132 and the resistance to return imposed by delay spring protuberances 148.

Figure 7:
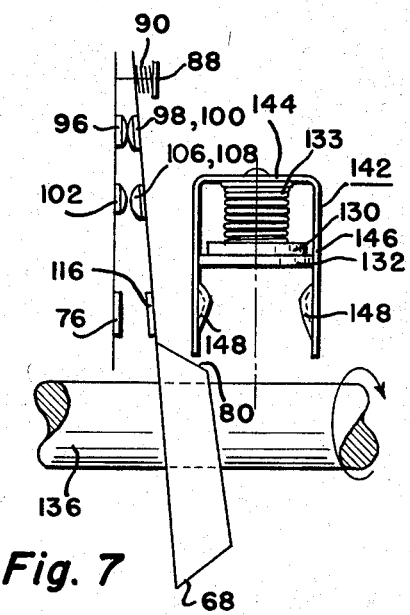
FIGURE 7 is a diagrammatic view of the centrifugal switch and actuating weight during high speed motor running position.
Figure 8:
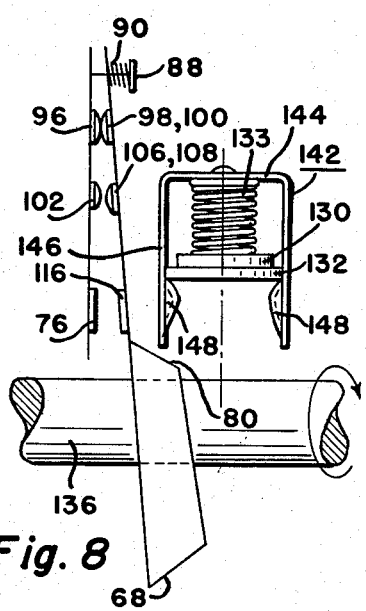
FIGURE 8 is a diagrammatic view of the centrifugal switch and actuating weight during low speed motor running position.
Figure 5:
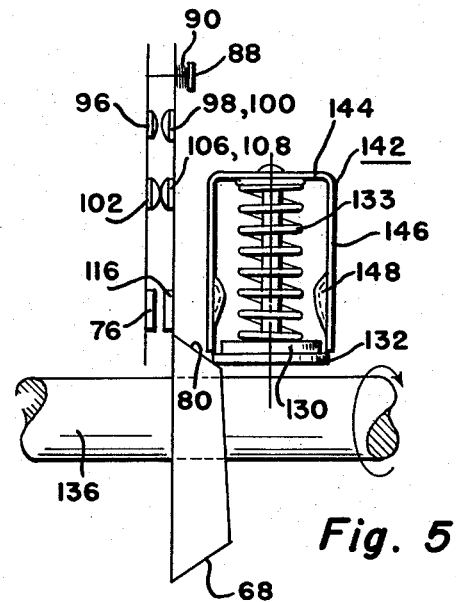
FIGURE 5 is a dagrammatic view of the centrifugal switch and its actuating weight immediately after motor energization with start winding contacts engaged.
Figure 6:
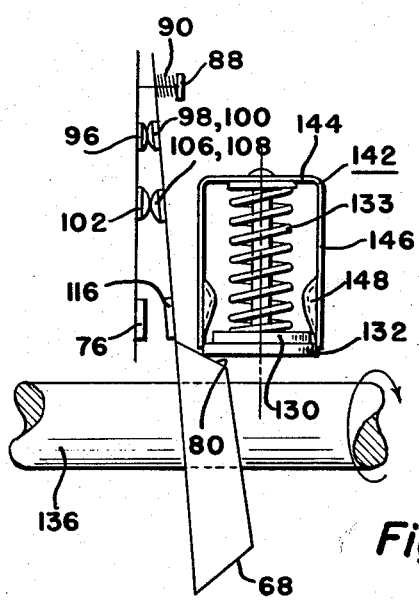
FIGURE 6 is a diagrammatic view of the centrifugal switch and its actuating weight in motor accelerating position.

For purposes of clarity, schematic diagrams of the centrifugal skillet switch 56 and its novel actuating elements are shown in FIGURES 5, 6, 7 and 8 merely to illustrate the skillet positions relative to control board 66 and motor shaft 136. The wide differential producing delay spring 142 has been rotated 90° from its actual relationship in FIGURES 3 and 4 to show clearly how the skillet provides the switching concepts embodied in this invention. These relative positions will be discussed fully hereinafter in connection with the wiring circuitry for motor 16. However, briefly stated, these representations illustrate the following relationships. FIGURE 3 illustrates the motor 16 at rest or at the instant of energization. The skillet 68 is held to the left against the bias of spring 90 by the action of nylon washer 132 against the top ledge or surface 81 of the skillet 68. In FIGURE 5, the motor shaft 136 has started to rotate (as indicated by the arrow) and the actuating disc 132 started to move outwardly into sliding relationship to skillet cam surface 80. Skillet contact 116 has broken from control panel contact 76, the start winding board contacts 102, 104 and skillet contacts 106, 108 are made and main winding skillet contact 100 is still disengaged from control board contact 96. FIGURE 6 shows the situation wherein board contact 76 and skillet contact 116 have moved apart to provide a sufficient gap at the point where contacts 96 and 100 mate to prevent short-circuiting during switching. Start winding contacts 102, 106 are still in the circuit. FIGURE 7 illustrates the motor high speed running condition wherein the main windings are energized in parallel through contacts 96 and 100. The start winding is out of the circuit at broken contacts 102, 106 and the skillet actuating disc 132 held fully outwardly against the action of spring 133 in accordance with the centrifugal force imposed by rotating shaft 136. FIGURE 8 shows the motor situation when energized for low speed run with the main windings connected in series through contacts 96, 100. The centrifugal force imposed upon the actuating disc 132 is insufficient in itself at motor low speed to hold the disc 132 fully outwardly; therefore, the restraining action of teardrop protuberances 148 acts to prevent the reengagement of disc 132 and skillet cam surface 80 during low speed run. This action effectively prevents the reenergization of the motor start winding which would cause the motor to accelerate to a higher speed.

Figure 9:
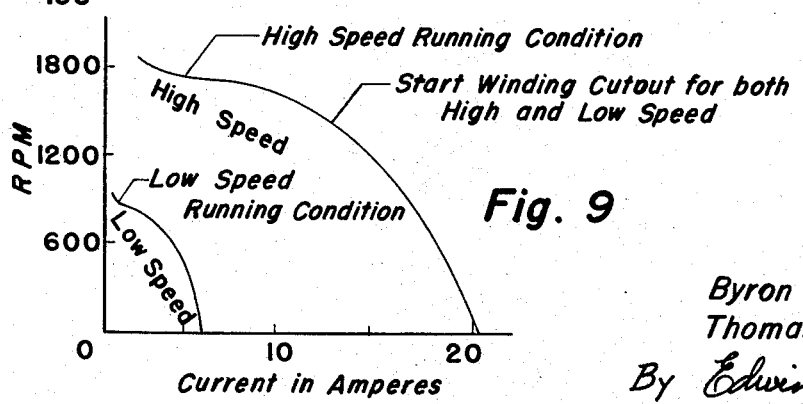
FIGURE 9 is a graph showing typical operating characteristics of a ⅓ H.P., 115-volts, 60-cycle, two-speed motor acceptable for use in multi-speed washing machines and suitable for use with this invention.

The control circuitry of this invention is believed best understood in connection with a washing machine cycle although the circuitry is in no way limited to this application. Where two-speed operation is desired for various washing machine functions, a motor producing high torque during start or stall conditions and low torque during high speed or running conditions, is acceptable. FIGURE 9 illustrates typical motor operating characteristics for both high speed and low speed operation. The graph illustrates the inverse ratio of motor speed or r.p.m. to power or current draw by the motor when operating at a particular speed. In my copending application S.N. 745,126 filed concurrently herewith, the variation in current draw is utilized to effect the switching arrangement for the consequent pole motor of this washing machine application. In the instant application, the variations in motor speed responding to the loads placed on the motor are utilized to centrifugally sense the motor situations wherein switching is desired. Attention is also directed to copending application S.N. 745,078 where electrical switching is applied to a single speed motor to accommodate automatically a variable washing machine load.

Figure 10:
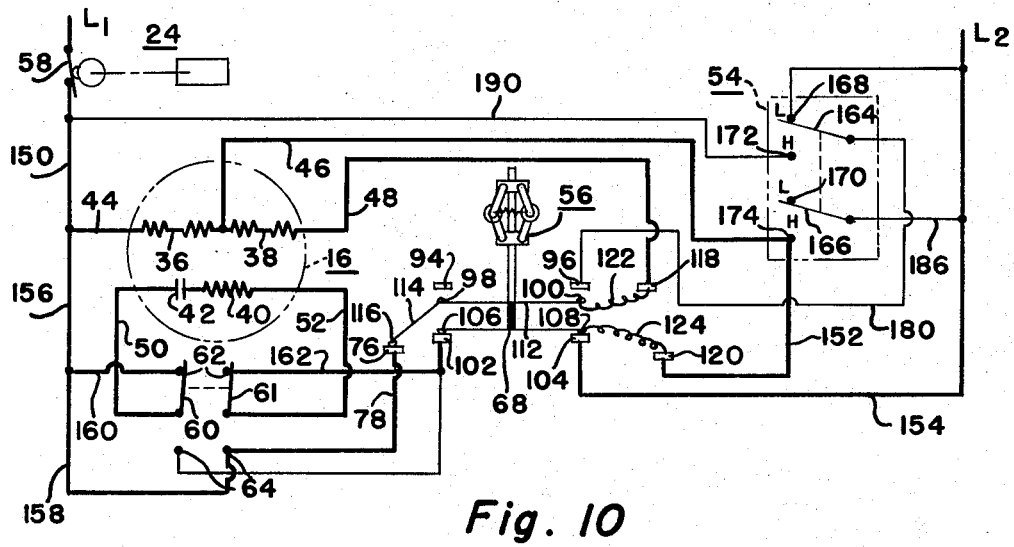
FIGURE 10 is a schematic wiring diagram of a motor control circuit set for low speed operation at start or stall condition.

Let us assume, now, that the operator has selected a low-speed washing machine cycle, i.e. the agitation produced by the action of agitator 12 and the centrifuging produced by the rotation of tub 14 is at a slow or delayed speed for those fabrics requiring a less severe washing action. The timer 24 is turned on to initiate the progressive action of the timer in producing a sequence of washing operations. Where the operation of motor 16 is required, the cam actuated timer switch 58 will be closed in accordance with timer operation to energize the motor circuit. At the same time, motor reversing switch blades 60, 61 are placed in condition by the timer for either agitation or spin in accordance with the particular washing machine function involved in the progress of the timer 24. Upon initiation of the motor circuit, the motor windings 36, 38 are connected in parallel. Main winding 36 is fed from $L_1$, timer switch 58, line 150, motor lead 44, main winding 36, line or motor lead 46, line 152, control board contact 120, pigtail or flexible connector 124, skillet contact 108, control board contact 104, line 154, to $L_2$. The other half of the main winding 38 is fed from $L_1$, cam actuated switch 58, line 150, line 156, line 158, line 78, control board contact 76, contact 116 of arm 114, skillet contact 98, bridging member 112, skillet contact 100, pigtail 122, control board contact 118, line 48, main winding 38 to line 46, from which point the circuit progresses in the same manner as for main winding 36. Start winding 40 is fed from $L_1$, cam actuated switch 58, line 150, line 156, line 160, reversing switch blades 60, line 50, start winding 40, line 52, switch blade 61, line 162, control board contact 102, skillet contact 106, through the skillet, skillet contact 108, control board contact 104, line 154 to $L_2$. At low speed setting, the switch 54 includes speed selector contact blades 164, 166, in addition to low speed contacts 168, 170 and high speed contacts 172 and 174. Since the operator has selected low speed, the selector blades 164, 166 engage the low speed contacts and are temporarily out of the circuit at the point of initiation of a motor operation. With reference to FIGURE 3, the skillet 68 is shown in the position it would assume in the circuitry of FIGURE 10. In this regard, the nylon disc 132 is shown forcing the skillet 68 to the left pivoting about contact 106 on 102 and 108 on 104. As the motor accelerates, the actuating disc 132 moves outwardly onto the skillet cam surface 80 in a manner to permit the skillet 68 to move to the right to permit contacts 76, 116 to break before contacts 96, 100 are made. The particular design or modification of the skillet 68 over the prior teachings of Shewmon is directed to preventing short circuits or arcing during any switching operation. Therefore, the idea is to secure as great a spread or break as possible between contacts 76 and 116 at the point where contacts 96 and 100 are made (FIGURE 6). Considering the axial or rocking distance along the skillet between contacts 98, 100 and 106, 108 and the parallel distance between 106, 108 and 116, the longer the latter distance in relation to the first distance, the greater will be the arc-preventing distance between contacts 76 and 116 when skillet contacts 98, 100 meet board contacts 94, 96. With reference to the actual skillet structure (FIGURES 3 and 4), these distances are incorporated by the addition of a depending arm 114 which extends from skillet contact 98 to a point adjacent control board contact 76.

Figure 11:
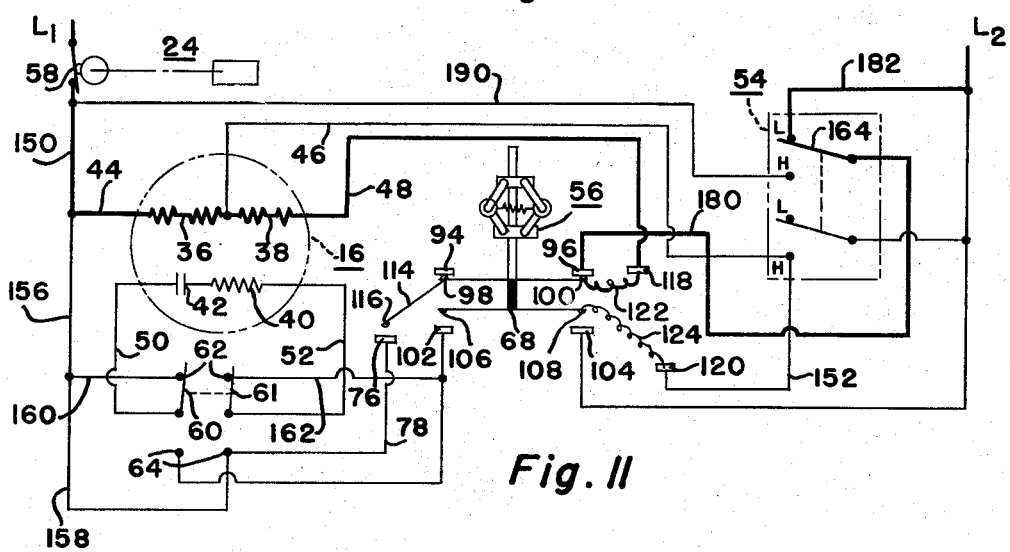
FIGURE 11 is a schematic wiring diagram of a motor control circuit set for low speed operation at running condition.

As evidenced in FIGURE 9, the motor accelerates to approximately 75% of high running speed for the motor 16 before the start windings are cut out. Thus, where low speed has been selected on dial 26 for switch 54, the motor 16 must coast or drift back to the low speed setting for the motor. FIGURE 7 illustrates that instant of start winding cutout wherein the centrifugal force imposed by the rotation of shaft 136 has forced the actuating disc 132 outwardly over the teardrop protuberances 148 and against the opposing bias of spring 133. In this relationship, the circuitry of FIGURE 11 is established with main windings in series to produce a low speed running operation of approximately 850 r.p.m. in the motor of the example. As the motor shaft 136 slows in response to the low speed selection on speed selector switch 54, the actuating disc 132 will tend to return to its position adjacent the motor shaft 136. For instance, if the start winding cutout is at approximately 75% of high speed run (1725 r.p.m.), the start winding will cut out at approximately 1300 r.p.m. Since the low speed operation is 850 r.p.m., the motor shaft 136 must drift from 1300 r.p.m. to 850 r.p.m. before the established circuitry effects a steady state low speed motor operation. Should the start winding 40 be cut in during this slow-down procedure, the motor 16 would again accelerate up to the start winding cutout point of 1300 r.p.m. and an unwanted cycling would occur. This invention, however, provides means for preventing the reenergization of the start winding 40 during low speed motor operation. With reference to FIGURE 8, the actuating disc 132 is shown resting on the teardrop protuberances 148 during low speed operation. Spring 142, in this instance, has been designed to hold out the disc 132 against the bias of spring 133 as long as the motor shaft 136 is rotating at approximately 700 r.p.m. or above. Thus, a wide differential has been established wherein a single start winding 40 is effective in either a low speed or a high speed situation. Of course, it should be obvious that the resilience of spring 142 and the size of the protuberances 148 may be varied to obtain any particular start winding cut-in desired.

In low speed run, FIGURE 11 illustrates that main windings 36 and 38 are wired in series from $L_1$, cam actuated switch 58, line 150, motor lead 44, main windings 36, 38, line 48, control board contact 118, pigtail 122, skillet contact 100, control board contact 96, line 180, selector switch blade 164, line 182 to $L_2$. Low speed operation will continue without any change in circuitry from FIGURE 11. The centrifugal switch arrangement 56 is shown schematically as retaining the skillet 68 in a main winding series connection relationship.

Let us now assume a blockage occurs in the washing machine 10 during low speed operation tending to stall or overload motor 16. The obstruction will tend to slow the rotational speed of motor shaft 136. Since the centrifugal switch 56 is responsive thereto, the skillet 68 will be actuated as soon as the speed of shaft 136 drops below approximately 700 r.p.m. or the speed determined by the design of springs 133 and 142 and protuberances 148. At this point, the protuberances 148 of delay spring 142 and the reduced centrifugal force acting upon the actuating disc 132, fail to overcome the bias of spring 133 and the disc 132 moves radially inwardly into engagement with the cam surface 80 of skillet 68. The skillet 68 is thus forced into the stall position of FIGURE 3 and the circuitry of FIGURE 10. The start winding 40 is thus brought into the circuit again to overcome the obstruction tending to stall the motor 16 and the motor 16 again accelerates to the start winding cutout point of 1300 r.p.m. If the obstruction has been eliminated, the motor speed will again drift down to the selected low speed and the washing machine slow speed operation continued. If the increased torque provided by the parallel connected main windings 36, 38 and the additional torque created through start winding 40 are insufficient to overcome the blockage and accelerate the motor, a conventional overload switch in motor 16 will open the motor circuit to prevent damage thereto.

The circuitry just described provides a low speed circuit for a two-speed motor wherein the motor is automatically placed in condition, in accordance with variations in motor speed, to switch the main windings or bring in the start winding to provide the torque necessary during the washing machine cycle.

Figure 12:
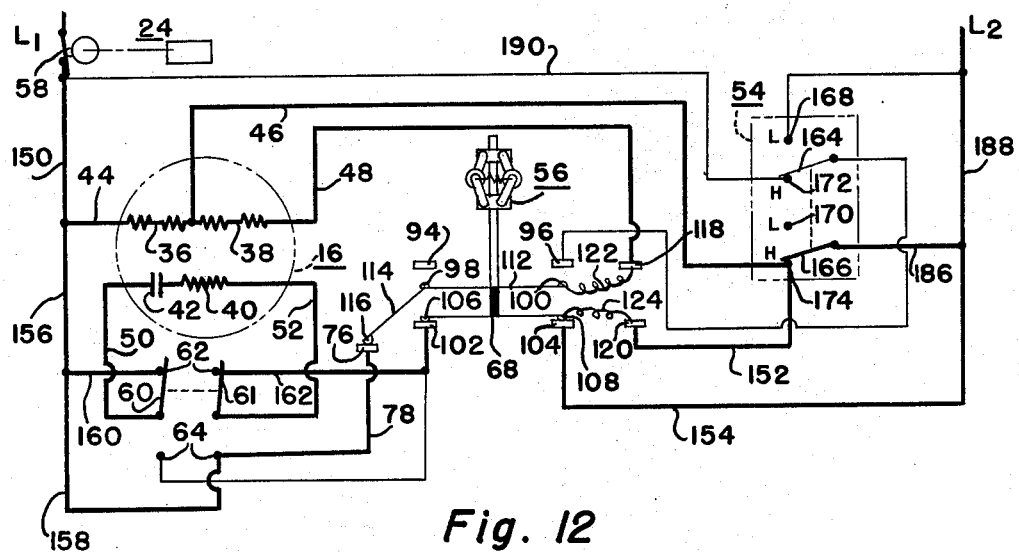
FIGURE 12 is a schematic wiring diagram of a motor control circuit set for high speed operation at start or stall condition.
Figure 13:
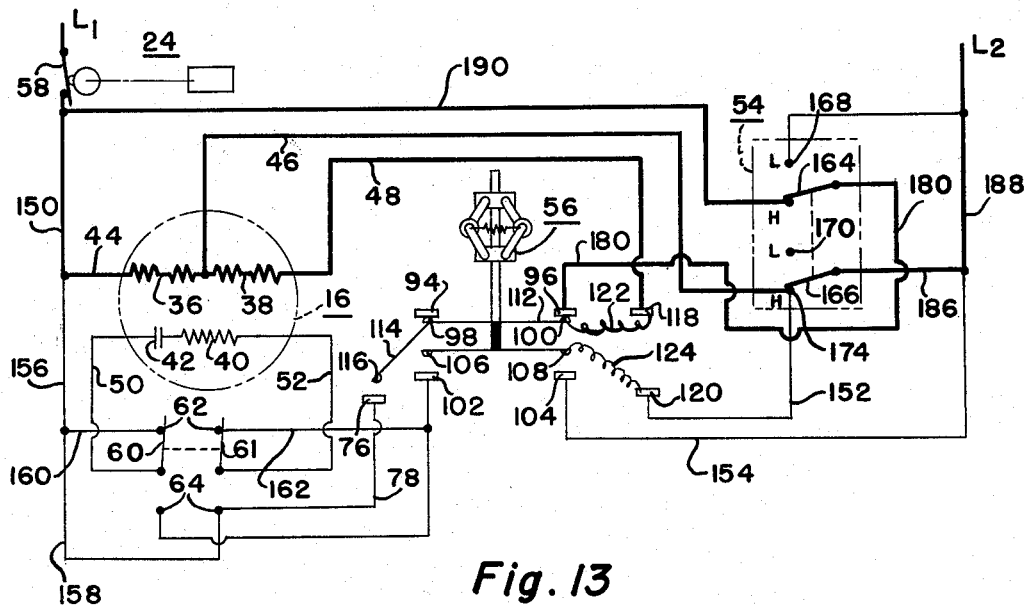
FIGURE 13 is a schematic wiring diagram of a motor control circuit set for high speed operation at running condition.

Let us assume, now, that a high speed operation has been selected on dial 26 which places the switch 54 in position for high speed motor operation. This situation would occur for regular fabrics in a clothes washing machine where normal agitational and normal centrifuging are acceptable for the fabrics being washed. FIGURE 12 illustrates the motor circuitry for a high speed spin cycle and particularly the circuitry at the instant of motor energization. In the consequent pole motor 16 high speed operation is secured with the main windings 36 and 38 wired in parallel. As the cam actuated timer switch 58 closes to initiate a spin cycle, main winding 36 is fed from $L_1$, switch 58, line 150, motor lead 44, motor lead 46, selector switch blade 166, line 186, line 188 to $L_2$. Main winding 38 is fed from $L_1$, timer switch 58, line 150, line 156, line 158, line 78, control board contact 76, skillet contact 116, arm 114, skillet bridging member 112, pigtail 122, control board contact 118, motor lead 48, main winding 38 to line 46. From motor lead 46 to $L_2$, the circuitry established is the same as for main winding 36. Simultaneous to the parallel wiring of main windings 36 and 38, the start winding 40 is included in the circuit to increase the torque available to start the motor 16 in the spin portion of the wash cycle for which the motor is adapted. For purposes of explanation, the timer reversing switch blades 60, 61 are shown in one position to cause the motor 16 to rotate in a manner to produce a spinning action of laundry tub 14 for instance. Thus, start winding 40 is fed from $L_1$, cam actuated switch 58, line 150, line 156, line 160, timer reversing switch blade 60, line 50, capacitor 42, start winding 40, line 52, timer reversing switch blade 61, line 162, control board contact 102, skillet contact 106 through the skillet to skillet contact 108, control board contact 104 and lines 154 and 188 to $L_2$. At the instant of energization, the relationship of the centrifugally actuated switch 56 is in the position shown in FIGURE 3. As the motor accelerates in response to the high speed selection on speed selector switch 54, the skillet 68 moves through the same positions shown in FIGURES 3, 5, 6 and 7 and explained in connection with the low speed motor operation. These positions are assumed substantially simultaneously and the start winding 40 is dropped out of the circuit when the rotational speed of motor shaft 136 reaches approximately 75% of high speed running condition, i.e., approximately 1300 r.p.m. At this point, the skillet actuating disc or washer 132 is thrown outwardly into the position of FIGURE 7 and the parallel wired relationship is established for main windings 36 and 38, as shown in FIGURE 13. Since high speed has been selected on switch 54, the motor 16 will continue to accelerate from the start winding cutout to the high speed operation of 1725 r.p.m.

FIGURE 13 is illustrative of the circuitry energized during high speed motor running operation. The main windings 36, 38 are wired to parallel with main winding 36 fed from $L_1$, cam actuated switch 58, line 150, motor lead 44, main winding 36, motor lead 46, selector switch blade 166, line 186, line 188 to $L_2$. Simultaneously, main winding 38 is fed in parallel through $L_1$, cam actuated switch 58, line 190, selector switch blade 164, line 180, control board contact 96, pigtail 122, control board contact 118, motor lead 48, main winding 38 to motor lead 46. From motor lead 46 the circuitry established to $L_2$ is identical to that recited in connection with main winding 36. The circuit just established will remain energized so long as the motor 16 is permitted to rotate at its high speed running condition. Any tendency to stall is sensed by the centrifugally actuated switching device 56 which, in response thereto, will pivot the skillet 68 to the motor circuitry of FIGURE 12 and thus bring in the start winding 40 as a means to reaccelerate the motor 16. It should now be apparent that FIGURE 12 illustrates motor circuitry for both motor start and motor stall or overload situations with high speed selected on switch 54. It should be equally apparent that the novel switching arrangement described hereinabove will operate automatically to place the motor 16 in condition to meet these varying motor load conditions.

Although the circuitry of this invention was explained in connection with a rotation of motor shaft 136 in one direction as prescribed by the placement of timer actuated reversing switches 60, 61, it should be understood that the reverse operation of motor shaft 136 will be controlled in exactly the same manner as described hereinabove. The only distinction from the circuits illustrated would involve the automatic timer positioning of timer reversing switch blades 60, 61 in their alternative position in engagement with reversing contacts 64. It might also be repeated at this point that contact 94 was placed on the control board 66 merely to balance control board contact 96 to effect an even pivoting movement for skillet 68.

While the embodiment of the present invention as herein disclosed constitutes a preferred form, it is to be understood that other forms might be adopted.

What is claimed is as follows:

In a control circuit for a washing machine having a movable member, a mechanism selectively connected to said movable member, a motor connected directly to said mechanism for moving said movable member, a source of power for operating said motor, said motor including a starting winding and first and second main windings energizable to effect high and low running speeds and a start winding cutout speed between said running speeds, a speed selector in power flow control relationship between said source of power and said motor and settable in a high running speed poistion wherein said speed selector is adapted to connect said power source to said main windings in parallel and a low running speed position wherein said speed selector is adapted to connect said power sourec to said main windings in series, switch means having portions thereof selectively in series power flow relationship with said motor and said speed selector and actuatably movable to a first position wherein a circuit is completed through said speed selector and said motor connecting one of said main windings to said power source in parallel with the other of said main windings irrespective of the position setting of said speed selector and connecting said start winding to said power source thereby to accelerate said motor to said start winding cutout speed, said switch means actuatably movable to a second position wherein a circuit is completed through said speed selector and said motor connecting said first and second main windings to said power source in series with each other and disconnecting said start winding from said power source when said speed selector is set in said low running speed position and the speed of said motor is at least as high as said start winding cutout speed, switch actuating means movable in response to motor speed and selectively actuatingly engageable with said switch means for controlling the movement of said switch means, said switch actuating means moving in response to a motor speed at least as high as said start winding cutout speed to facilitate the movement of said switch means from said first position to said second position, and delay means selectively engageable with said switch actuating means during the movement of said switch actuating means in response to motor speed, said delay means engaging said switch actuating means to retain said switch actuating means when said switch means is in said second position and the speed selector is in said low running speed position and the speed of said motor is below said start winding cutout speed thereby to prevent said switch actuating means from moving in response to motor speed and therefore to prevent said switch actuating means from controlling the movement of said switch means to said first position while said motor is operating in said low running speed, said delay means disengaging said switch actuating means at a predetermined speed below said low running speed to release said switch actuating means for movement in response to motor speed, the released switch actuating means then actuatingly engaging said switch means for controlling the movement of said switch means to said first position to reconnect the windings of said motor thereby to return the operation of said motor to said low running speed.

References Cited in the file of this patent
UNITED STATES PATENTS

| | | |
|---|---|---|
| 1,886,895 | Myers | Nov. 8, 1932 |
| 1,922,806 | Heinrich | Aug. 15, 1933 |
| 1,928,476 | Baur et al. | Sept. 26, 1933 |
| 2,210,687 | Schaelchin et al. | Aug. 6, 1940 |
| 2,774,924 | Witt | Dec. 18, 1956 |
| 2,841,003 | Conlee | July 1, 1958 |
| 2,881,633 | Warhus | Apr. 14, 1959 |